United States Patent [19]

Höfer

[11] 4,073,577

[45] Feb. 14, 1978

[54] CONTACT LENSES OF HYDROPHILIC POLYMERS MADE BY PHOTOPOLYMERIZATION

[75] Inventor: Peter Höfer, Aschaffenburg, Germany

[73] Assignee: Titmus Eurocon Kontaktlinsen KG, Aschaffenburg, Germany

[21] Appl. No.: 735,227

[22] Filed: Oct. 22, 1976

Related U.S. Application Data

[63] Continuation of Ser. No. 604,516, Aug. 13, 1975, abandoned, which is a continuation of Ser. No. 442,719, Feb. 14, 1974, abandoned.

[30] Foreign Application Priority Data

Feb. 19, 1973 Germany .............................. 2308047

[51] Int. Cl.$^2$ .............................................. G02C 7/04
[52] U.S. Cl. ................................ 351/160; 204/159.22; 204/159.23; 204/159.24; 260/885; 264/1; 264/22
[58] Field of Search ........................... 264/1; 351/160; 204/159.23, 159.24, 159.22; 260/885

[56] References Cited

U.S. PATENT DOCUMENTS

| | | | |
|---|---|---|---|
| 3,515,656 | 6/1970 | Huang et al. | 204/159.22 |
| 3,647,736 | 3/1972 | Ewell | 264/1 |
| 3,792,028 | 2/1974 | Seiderman | 260/885 |
| 3,816,571 | 6/1974 | O'Driscoll et al. | 260/885 |
| 3,822,196 | 7/1974 | O'Driscoll et al. | 204/159.22 |

*Primary Examiner*—Richard B. Turer
*Attorney, Agent, or Firm*—Burgess, Dinklage & Sprung

[57] ABSTRACT

A contact lens is made from a polymer hydrogel by photopolymerizing a hydroxyalkyl acrylate or methacrylate in the absence of a cross-linking agent. The polymer hydrogel can also be formed by photopolymerization carried out in the presence of a catalyst responsive to short-wave light. Heat can also be used in combination with the photopolymerization to assist in formation of the polymer hydrogel contact lens.

11 Claims, No Drawings

__NUMBER__4,073,577

CONTACT LENSES OF HYDROPHILIC POLYMERS MADE BY PHOTOPOLYMERIZATION

This application is a continuation of Ser. No. 604,516, filed Aug. 13, 1975, now abandoned, which in turn is a continuaation of Ser. No. 442,719, filed Feb. 14, 1974, also abandoned.

BACKGROUND

This invention relates to a contact lens formed from a polymer hydrogel made by photopolymerizing a hydroxyalkyl acrylate or methacrylate in the absence of a cross-linking agent.

Hydrophilic plastics for the production of contact lenses have recently gained more and more in interest. Contact lenses of the aforementioned materials are soft and gelatinous, adjust extremely well to the eye and, are therefore more pleasant to wear than lenses made of the conventional, relatively inflexible and unpliable plastics.

It is known to use copolymers of monomeric hydroxyalkyl acrylates or -methacrylates and di- or mono-olefin glycol diacrylates or -methacylates for the production of contact lenses. The monomers are made to polymerize by free-radical forming catalysts at elevated temperature like, for instance, peroxides.

U.S. Pat. No. 3,220,960 to Wichterle et al describes cross-linked hydrophilic polymers that are prepared from esters of acrylic acid and methacrylic acid with alcohols carrying hydrophilic groups. Hydrophilic, plastic contact lenses on the basis of, for instance, hydroxypropyl methacrylate, lauryl methacrylate and polyethyleneglycol methacrylate are the subject matter of U.S. Pat. No. 3,503,946 to Seidermann.

As is known, the water absorptivity of these hydrophilic copolymers depends to a high degree upon the degree of cross-linking, i.e. the desirable high water absorption can be attained only with copolymers with a low degree of cross-linking. However, a disadvantage is that the mechanical and optical properties of such copolymers do not always optimally meet the specifications set forth for contact lenses.

It was therefore necessary to develop a hydrophilic material for the production of contact lenses, which can be prepared in an economical and simple manner, guarantees high water absorption as a result of minimum cross-linking, is gelatinous in the hydrated state, and exhibits mechanical properties which meet the highest standards.

SUMMARY

Surprisingly it has been found that contact lenses comprising the hydrogel of a polymer of a hydroxyalkyl acrylate or methacrylate made by photopolymerization in the absense of cross-linking agents meet the aforementioned requirements.

DESCRIPTION

Monomeric hydroxyalkyl acrylates or methacrylates for the preparation of the polymers suitable for the contact lenses according to the invention can be selected from the entire known class of these monomers. Basically, the most varied hydroxyalkyl esters of acrylic acid or methacrylic acid can be used as starting materials, although, for instance, the hydroxyethyl esters and the hydroxypropyl (and isopropyl) esters are given a certain preference because of their general availability. Generally the hydroxyalkyl portion of the monomer contains from 2 to 6 carbon atoms and one hydroxy group.

An essential feature of the instant invention is the fact that the polymers for the production of the contact lenses are made by photopolymerization of the monomers, i.e. by subjecting the starting monomer to irradiation of a suitable wavelength. By this procedure it is possible to work without the use of a separate cross-linking agent. Instead, the necessary cross-linking occurs to a sufficient extent during the conversion via reaction of the starting molecules with the hydroxyl groups on the chain.

One of the advantages is that uncontrolled local cross-linking is prevented so that the polymer obtained is more homogeneous with respect to mechanical properties and water absorptivity. Moreover, the polymerization time is considerably shortened as compared to other materials for contact lenses, and the process is simplified. The omission of cross-linking and, thus, the use of only one single monomer also results in the production of polymers of a very high purity. Their degree of purity is further enhanced by the sterilizing effect of the short-wave irradiation.

It is advisable to produce the hydrophilic polymers in an illuminating chamber, which is described below (cf. Example 1) in more detail; in this illuminating chamber, the monomer which is placed in a mold and, in a given case, is provided with additives, is irradiated by light of an appropriate wavelength and during a sufficiently long period of time. Usually, short-wave light having a wavelength of 270 mm to 600 mm is used. It is understood, however, that the photopolymerization may be carried out in any other device suitable for this purpose.

In a preferred embodiment of the invention, the contact lenses consist of hydrogels on the basis of hydroxyalkyl acrylate or methacrylate polymers prepared by photopolymerization in the presence of catalysts that respond to short-wave light. These catalysts are used in quantities of up to 1%, calculated on the weight of the hydroxyalkyl acrylate or methacrylate used. The use of catalysts of the dixanthogenate type, such as di-iso-propyl-xanthogenate, has proven particularly useful for this purpose.

Other useful catalysts are as follows:

| Catalyst Class | Examples |
|---|---|
| Thermally unstable compounds | $H_2O_2$ |
| | Azoisobutyronitrile |
| | Peroxide |
| Ketones | Acetophenone |
| | Benzophenone |
| | Benzoine |
| | Benzoine derivates |
| | Acetoine |
| | a-Dicetomonoximester |
| Chinones | Anthrachinone derivates |
| Disulfides | Diphenyl disulfide |
| Halogen compounds | Styroldibromide |
| Metal carbonyls | Dimanganedecacarbonyl |
| + Perchloro compounds | + chloroform |
| Others | Iron salts |
| | Uranyle salts |
| | Organic sulfonium acids |
| | + dye |
| | Hexarylbisimidazol |

The photopolymerization of the monomeric starting material is usually carried out at room temperature. But it is also possible to carry out the polymerization at a higher temperature and thereby supplement the photopolymerization by a thermal polymerization. The temperatures to be observed in that case vary within a range of from about 35° to about 80° C. The thermal polymerization may furthermore be supported by the use of catalysts that form radicals at elevated temperatures. Peroxy and azo compounds, such as 2,2'-azo-bis-(2-methylpropionitrile), which are preferably used in quantities of up to 5% by weight, based on the monomer, have proven particularly suitable therefor.

Photopolymerization and thermal polymerization may take place either simultaneously or successively. In that case, first photopolymerization is carried out and thereafter thermal polymerization is initiated by an increase in temperature, which acts in the direction of a hardening of the primary polymer.

The polymerization rate is a function of the catalyst concentration and the light intensity, and is directly proportional to both incluences. In order to obtain polymers having the same absorptivity, the light intensity has to be reduced in the case of an increase in catalyst use and vice versa.

In particular, when the polymerization is carried out exclusively using irradiation, an inert gas atmosphere has to be maintained in the reaction apparatus. In this manner the stabilizing effect of atmospheric oxygen upon the surface hardening of the moldings is excluded.

The polymers obtained in the manner described exhibit a water absorption of 60 to 62% by weight and a water content of 38 to 39% by weight.

As required by practice, the contact lenses according to the invention have an extremely high stress capacity due to their ductility which amounts to a quadruple of their original dimensions. The result is high resistance to initial and further tearing.

Photopolymerization is a light-initiated polymerization reaction. From the monomer are photolytically formed radicals that initiate the polymerization. Initiating (actinic) radiation can be, for example, visible light, ultraviolet light and X-rays. The direct excitation of the monomers often requires, according to the position of the absorption bands, a very short-wave ultraviolet light. In order to be able to polymerize with longer-wave light sufficiently quickly, one frequently adds to the polymerizable starting materials, catalysts, also called photo sensitizers, which absorbe longer-wave light and thereby form polymerization-initiating radicals.

EXAMPLE 1

A mixture having the following composition is polymerized:

100 parts of 2-hydroxyethyl methacrylate (hereinafter called "hema")

0.08 parts of di-iso-propylxanthogenate (hereinafter called "diproxide")

Since the commercially available "hema" does not always have the degree of purity imperative in a raw material for the production of contact lenses, the hema is first filtered and subsequently subjected to a fraction distillation under vacuum in a Vigreux column using a reflux ration of 1 : 10. The stabilizer content in the still is increased to 500 ppm of hydroquinone prior thereto in order to prevent a polymerization in the distillation flask. For the same reason it is necessary to protect th entire unit from direct light and to draw atmospheric oxygen via a capillary through the liquid in the distillation flask during the entire duration of the distillation. It is not possible to observe a difference in temperature between the clear, yellow preliminary fraction, which has a pungent ester-like odor, and the clear, transparent main fraction so that the distillates have to be distinguished by color and refractive index. The refractive index of the main fraction is $n_{20}^D$ 1.452, whereas that of the preliminary fraction does not exceed $n_{20}^D$ 1.451. With this purification method approximately 60% pure starting material are obtained (it is not advisable to try to reach a higher yield), which contains a maximum of 20 ppm of hydroquinone. This small hydroquinone content was not found to be disturbing. The distillate has to be stored in a cool and dark place. The storage time should not exceed one week since the more highly hygroscopic liquid will otherwise absorb too much water from the air.

The hema purified and freed from stabilizer in the manner described above is used as monomer for the polymerization.

The catalyst, too, has to be purified prior to its use in the polymerization reaction. For this purpose it is recrystallized from acetone.

Both starting materials are intensively mixed with one another under exclusion of direct light and are filled in to transparent molds made, for instance, of polyethylene, which are placed on a metal sheet perforated by holes of approximately 15 mm. This sheet is exposed to the action of short-wave light in a light oven especially developed for the polymerization; the double walls of the light oven are provided with heating coils 15 mm a warming cabinet.

Phillips tubes with the designation TLA 20 W/05 are used as sources for the short-wave light; each of these tubes is connected separately to built-in time switches, and the tubes are mounted on the ceiling and bottom of the oven. The inside walls of the light oven are treated with the vapors of strongly reflecting materials e.g. silver, or are lined with foil. In the walls of the oven bushings are provided for the exclusion of vacuum and the connection of a temperature recorder respectively.

A tinted glass pane is inserted into the air-tight door in order to make sight control possible. The height of the sheet metal holding the molds is continuously adjustable since the polymerization rate is dependent upon both the catalyst quantity and the light intensity of the lamps disposed at the ceiling and the bottom.

In the Example described, the distance between the molds and the top lamps is approximately 20 cm and that between the molds and the bottom tubes is approximately 10 cm. The number of light sources depends on the size of the oven and has to be such that the carrying sheet is evenly irradiated.

In order to prevent the stabilizing effect of the atmospheric oxygen of the surface hardening of the moldings, the air in the oven is exchanged for an inert gas such as nitrogen or carbon dioxide. About 1 hour after switching on the lamps, the material is polymerized sufficiently in order to be machined into contact lenses following tempering for three hours at 50 to 100° C. and subatmospheric pressure.

EXAMPLE 2

A mixture having the following composition is polymerized:

100 parts of 2-hydroxyethyl methacrylate 0.09 parts of di-iso-propyl xanthogenate 0.03 parts of 2,2'-azo-bis-(2-methylpropionitrile) (also named α,α'-azo-di-iso-butyronitril)

In this case, 2,2'-azo-bis-(2-methylpropionitrile) recrystallized from alcohol is used as additional heat catalyst in order to realize a quicker and more complete hardening of the residual monomer during the illumination operation.

The two catalysts are intensively admixed to the purified monomer and polymerized in the aforedescribed oven (cf. Example 1) under the simultaneous action of light and heat, the temperature being 35° to 80°. An inert gas atmosphere is not necessary, since the surface hardening is sufficient as a result of the second catalyst.

EXAMPLE 3

A mixture of the following composition is polymerized:
100 parts of 2-hydroxyethyl methacrylate
0.09 parts of di-iso-prolyl xanthogenate
0.03 parts of $\alpha,\alpha'$-azo-di-iso-butyronitrile As described above, the mixture is first polymerized by means of light and subsequently post-polymerized using heat without the action of light, since in the absence of an atmosphere of inert gas, such as nitrogen, the atmospheric oxygen has the effect of an inhibitor and the surface of the polymer does not completely harden. Contact lenses made of the material in accordance with Examples 2 and 3 have the same properties as those made of the polymer according to Example 1.

EXAMPLE 4

A mixture of the following composition is polymerized:
100 parts of 2-hydroxyethyl methacrylate
0.06 parts of di-iso-propyl xanthogenate
0.06 parts of $\alpha,\alpha'$-azo-di-iso-butyronitrile An increase in the proportion of $\alpha,\alpha'$-azo-di-iso-butyronitrile to the quantity of diproxide yields the same results as in Example 1 according to both the process of Example 2 and the process of Example 3, but in both cases the light intensity has to be reduced since, otherwise, polymers of too low a molecular weight are produced having too low a water absorptivity.

EXAMPLE 5

100 parts 2-hydroxypropylmethacrylate and 0.09 parts $\alpha,\alpha'$-azo-di-iso-butyronitrile are mixed well with one another within one hour. Polymerization takes place in molds at 30°–90° C in a heat oven. After hardening in the heat oven at 60°–120° C and a low pressure of 20–400 Torr, the mechanicl work takes place. Water absorption is about 34%.

EXAMPLE 6

100 parts 2-hydroxyethylmethacrylate is distilled until a purity of 99.43% is reached in the gas chromatogram. The pure monomer is poured into molds and is polymerized for 8 hours in a UV-light oven with lamps TIA 20/05. The hardening takes place in the vacuum oven at a subatmospheric pressure of 50–400 Torr and at a temperature of 60°–120° within one hour. The unfinished blanks thus obtained can be normally worked on. Water absorption, in contrast to Examples 1 and 2, is lower by 6% and the other characteristics, however, are similar.

EXAMPLE 7

A mixture of the following composition is polymerized:
100 parts 2-hydroxypropylmethacrylate
0.09 parts diisopropylxantogenate
0.03 parts $\alpha,\alpha'$-azo-di-iso-butyrinitrile.

After thorough mixing of the constituents with a magnetic stirring device, the mixture is poured into molds and polymerized for 60 minutes under UV-light as in Example 6, and hardened at a temperature of 60°–120° C and a subatmospheric pressure of 50–400 Torr. After tempering, the usual lenses were produced and normally hydrated. Water absorption is lower by 25% than in the examples with hydroxyethylmethacrylate, while the linear swelling is less by 11%.

The following monomers can be polymerized according to the invention using the procedures of the foregoing examples:
Methylmethacrylate
Ethylmethacrylate
n-Butylmethacrylate
Isobutylmethacrylate
$\beta$-Hydroxypropyl methacrylate
Laurylmethacrylate
Allylmethacrylate
Cyclohexylmethacrylate
2-hydroxypropylacrylate (manufactured by Rohm GmbH., Darmstadt).

What is claimed is:
1. Contact lens consisting essentially of a hydrogel of a polymer of a single monomer selected from the group consisting of a hydoxyalkyl acrylate and a hydroxyalkyl methacrylate, said single monomer being photopolymerized in the absence of a cross-linking agent.
2. Contact lens of claim 1 wherein photopolymerization is carried out in the presence presence of a catalyst responsive to short-wave light.
3. Contact lens of claim 2 wherein the catalyst is used in a quantity of up to 1.0% by weight, based on the hydroxyalkyl acrylate or methacrylate.
4. Contact lens of claim 2 wherein the catalyst is a dixanthogenate.
5. Contact lens of claim 1 wherein photopolymerization is carried out by the simultaneous action of short-wave light and heat.
6. Contact lens of claim 5 wherein photopolymerization is carried out at temperatures of 35° to 80° C.
7. Contact lens of claim 6 wherein photopolymerization is carried out in the presence of a catalyst responsive to elevated temperatures.
8. Contact lens of claim 7 wherein the catalyst is used in a quantity of up to 5% by weight, based on the hydroxyalkyl acrylate or methacrylate.
9. Contact lens of claim 7 wherein the catalyst in an azo compound.
10. Contact lens of claim 1 wherein photopolymerization is carried out, first, under the action of short-wave light and, subsequently, by increasing the temperature to 35° to 80° C.
11. Process for making a contact lens which consists essentially of forming a polymer hydrogel of a single monomer by photopolymerizing a hydroxyalkyl acrylate or methacrylate in the absence of a cross-linking agent and thereafter shaping the polymer hydrogel of said single monomer into a contact lens.

* * * * *